(12) United States Patent
Miller et al.

(10) Patent No.: US 12,631,143 B2
(45) Date of Patent: May 19, 2026

(54) GAS TURBINE ENGINE WITH HEAT EXCHANGER ASSEMBLY

(71) Applicant: General Electric Company, Schenectady, NY (US)

(72) Inventors: Brandon Wayne Miller, Middletown, OH (US); Jessica Breanna Imgrund, Cincinnati, OH (US); Eric Barre, Cincinnati, OH (US); Kirk Douglas Gallier, Liberty Township, OH (US); John R. Holland, West Chester, OH (US); Steven Douglas Johnson, Milford, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/619,703

(22) Filed: Mar. 28, 2024

(65) Prior Publication Data

US 2025/0305454 A1 Oct. 2, 2025

(51) Int. Cl.
*F02C 7/141* (2006.01)
*F02C 6/08* (2006.01)
(Continued)

(52) U.S. Cl.
CPC ................ *F02C 7/141* (2013.01); *F02C 6/08* (2013.01); *F02C 7/14* (2013.01); *F02C 7/18* (2013.01);
(Continued)

(58) Field of Classification Search
CPC .... F02C 6/08; F02C 7/14; F02C 7/141; F02C 7/18; F02C 7/185; F02C 9/18; F05D 2260/213; F05D 2260/606
See application file for complete search history.

(56) References Cited

U.S. PATENT DOCUMENTS

| | | | |
|---|---|---|---|
| 1,963,906 A | 6/1934 | Jaffe | |
| 2,181,927 A | 12/1939 | Townsend | |

(Continued)

FOREIGN PATENT DOCUMENTS

| | | | |
|---|---|---|---|
| CN | 105508054 A | 4/2016 | |
| DE | 102005049067 A1 | 4/2007 | |

(Continued)

OTHER PUBLICATIONS

Co-Pending U.S. Appl. No. 18/071,722, filed Nov. 30, 2022.
(Continued)

*Primary Examiner* — Kyle Robert Thomas
(74) *Attorney, Agent, or Firm* — Dority & Manning, P.A.

(57) ABSTRACT

A gas turbine engine includes a fan assembly, a turbomachine defining in part a working gas flowpath, the gas turbine engine defining a bypass passage over the turbomachine, a core cowl, and a heat exchanger assembly including a heat exchanger and a heat exchanger cowl defining a cooling air flowpath extending between a flowpath inlet in airflow communication with the bypass passage to receive a cooling airflow from the bypass passage and a flowpath outlet in airflow communication with the bypass passage to exhaust the cooling airflow back to the bypass passage, the heat exchanger positioned within the cooling air flowpath, the cooling air flowpath comprising a diffusion section located between the flowpath inlet and the heat exchanger.

20 Claims, 9 Drawing Sheets

(51) Int. Cl.
    *F02C 7/14*         (2006.01)
    *F02C 7/18*         (2006.01)
    *F02C 9/18*         (2006.01)

(52) U.S. Cl.
    CPC ................ *F02C 7/185* (2013.01); *F02C 9/18* (2013.01); *F05D 2260/213* (2013.01); *F05D 2260/606* (2013.01)

(56)          References Cited

U.S. PATENT DOCUMENTS

| | | | |
|---|---|---|---|
| 2,343,542 A | 3/1944 | Faunce | |
| 2,479,071 A | 8/1949 | Henstridge | |
| 2,872,165 A | 2/1959 | Wennerberg | |
| 2,939,686 A | 6/1960 | Wildermuth | |
| 3,072,225 A | 1/1963 | Cremer et al. | |
| 3,161,234 A | 12/1964 | Rannenberg | |
| 3,334,399 A | 8/1967 | Teeguarden | |
| 3,528,250 A | 9/1970 | Johnson | |
| 3,638,428 A | 2/1972 | Shipley et al. | |
| 3,643,733 A | 2/1972 | Hall et al. | |
| 3,735,588 A | 5/1973 | Moskowitz et al. | |
| 3,757,855 A | 9/1973 | Kun et al. | |
| 3,807,496 A | 4/1974 | Stadmark | |
| 3,841,271 A | 10/1974 | Harris, Jr. et al. | |
| 3,885,942 A | 5/1975 | Moore | |
| 3,948,317 A | 4/1976 | Moore | |
| 4,109,710 A | 8/1978 | Forster et al. | |
| 4,137,705 A | 2/1979 | Andersen et al. | |
| 4,211,208 A | 7/1980 | Lindner | |
| 4,216,937 A | 8/1980 | Bridgnell et al. | |
| 4,246,959 A | 1/1981 | Byrne | |
| 4,253,520 A | 3/1981 | Friedericy et al. | |
| 4,254,618 A | 3/1981 | Elovic | |
| 4,275,785 A | 6/1981 | Kerivan | |
| 4,328,860 A | 5/1982 | Hoffmuller | |
| 4,446,696 A | 5/1984 | Sargisson et al. | |
| 4,470,455 A | 9/1984 | Sacca | |
| 4,503,908 A | 3/1985 | Rosman et al. | |
| 4,596,285 A | 6/1986 | Dinulescu | |
| 4,638,857 A | 1/1987 | Fournier | |
| 4,676,303 A | 6/1987 | Barroyer et al. | |
| 4,676,305 A | 6/1987 | Doty | |
| 4,698,964 A | 10/1987 | Glancy | |
| 4,785,879 A | 11/1988 | Longsworth et al. | |
| 4,815,532 A | 3/1989 | Sasaki et al. | |
| 4,854,380 A | 8/1989 | Yoshida et al. | |
| 4,880,055 A | 11/1989 | Niggemann et al. | |
| 5,033,542 A | 7/1991 | Jabs | |
| 5,074,118 A | 12/1991 | Kepler | |
| 5,123,242 A | 6/1992 | Miller | |
| 5,243,815 A | 9/1993 | Maier et al. | |
| 5,251,692 A | 10/1993 | Haussmann | |
| 5,269,135 A | 12/1993 | Vermejan et al. | |
| 5,279,109 A | 1/1994 | Liu et al. | |
| 5,363,654 A | 11/1994 | Lee | |
| 5,511,613 A | 4/1996 | Mohn et al. | |
| 5,544,700 A | 8/1996 | Shagoury | |
| 5,695,007 A | 12/1997 | Fauconnier et al. | |
| 5,775,412 A | 7/1998 | Montestruc, III et al. | |
| 5,810,077 A | 9/1998 | Nakamura et al. | |
| 5,820,654 A | 10/1998 | Gottzman et al. | |
| 5,987,877 A | 11/1999 | Steiner | |
| 6,422,306 B1 | 7/2002 | Tomlinson et al. | |
| 6,474,408 B1 | 11/2002 | Yeh et al. | |
| 6,584,778 B1 | 7/2003 | Griffiths et al. | |
| 6,945,320 B2 | 9/2005 | Harvard, Jr. et al. | |
| 7,185,483 B2 | 3/2007 | Czachor | |
| 7,220,392 B2 | 5/2007 | Rong et al. | |
| 7,255,159 B2 | 8/2007 | Sagasser et al. | |
| 7,343,965 B2 | 3/2008 | Memory et al. | |
| 7,377,100 B2 | 5/2008 | Bruno et al. | |
| 7,575,793 B2 | 8/2009 | Aniolek et al. | |
| 7,650,935 B2 | 1/2010 | Demuth et al. | |
| 7,779,898 B2 | 8/2010 | Morrison et al. | |
| 7,784,528 B2 | 8/2010 | Ottow et al. | |
| 7,823,374 B2 | 11/2010 | Venkataramani et al. | |
| 7,845,159 B2 | 12/2010 | Venkataramani et al. | |
| 7,861,512 B2 | 1/2011 | Olver et al. | |
| 7,866,377 B2 | 1/2011 | Slaughter | |
| 7,900,437 B2 | 3/2011 | Venkataramani et al. | |
| 7,966,831 B2 | 6/2011 | Kraft et al. | |
| 8,256,202 B1 | 9/2012 | Paulino | |
| 8,266,888 B2 | 9/2012 | Liu | |
| 8,266,889 B2 | 9/2012 | Coffinberry | |
| 8,353,330 B2 | 1/2013 | Lim et al. | |
| 8,381,803 B2 | 2/2013 | Kim et al. | |
| 8,522,521 B2 | 9/2013 | Dyer | |
| 8,596,076 B1 | 12/2013 | Gritton et al. | |
| 8,708,036 B2 | 4/2014 | Ikeda | |
| 8,826,970 B2 | 9/2014 | Shiraichi et al. | |
| 9,109,514 B2 | 8/2015 | Cheong | |
| 9,127,598 B2 | 9/2015 | Snook et al. | |
| 9,249,730 B2 | 2/2016 | Bourassa et al. | |
| 9,599,379 B2 | 3/2017 | Ha et al. | |
| 9,623,354 B2 | 4/2017 | Kumar et al. | |
| 9,752,835 B2 | 9/2017 | Waldman et al. | |
| 9,777,963 B2 | 10/2017 | Martinez et al. | |
| 9,835,380 B2 | 12/2017 | Kupiszewski et al. | |
| 9,932,905 B2 | 4/2018 | Suciu et al. | |
| 9,982,598 B2 | 5/2018 | Pritchard, Jr. et al. | |
| 10,006,369 B2 | 6/2018 | Kupiszewski | |
| 10,107,200 B2 | 10/2018 | Miller et al. | |
| 10,119,466 B2 | 11/2018 | Schwarz et al. | |
| 10,175,003 B2 | 1/2019 | Sennoun et al. | |
| 10,208,676 B2 | 2/2019 | Johnson et al. | |
| 10,247,324 B2 | 4/2019 | Magee | |
| 10,287,992 B2 | 5/2019 | Tan et al. | |
| 10,352,191 B2 * | 7/2019 | Weiner | F02K 3/115 |
| 10,378,835 B2 | 8/2019 | Kenworthy et al. | |
| 10,486,816 B2 | 11/2019 | Army et al. | |
| 10,502,502 B2 | 12/2019 | Sennoun et al. | |
| 10,590,856 B2 | 3/2020 | Howarth | |
| 10,634,054 B2 | 4/2020 | Schmitz | |
| 10,670,349 B2 | 6/2020 | Wilson et al. | |
| 10,794,281 B2 | 10/2020 | Nestico et al. | |
| 10,794,288 B2 | 10/2020 | Schwarz et al. | |
| 10,821,509 B2 | 11/2020 | Manteiga et al. | |
| 10,830,179 B2 | 11/2020 | Hatim | |
| 10,830,540 B2 | 11/2020 | Sennoun et al. | |
| 10,934,939 B2 | 3/2021 | Miller et al. | |
| 11,060,462 B2 | 7/2021 | Fert et al. | |
| 11,073,090 B2 | 7/2021 | Nestico et al. | |
| 11,174,816 B2 * | 11/2021 | Banham | F02C 7/14 |
| 11,572,827 B1 | 2/2023 | Khalid et al. | |
| 11,608,743 B1 | 3/2023 | Tweedt et al. | |
| 11,731,774 B2 * | 8/2023 | Pretty | E05D 3/125 |
| | | | 244/131 |
| 2002/0005275 A1 | 1/2002 | O'Donnell et al. | |
| 2003/0131978 A1 | 7/2003 | Nakano | |
| 2003/0159807 A1 | 8/2003 | Ayres et al. | |
| 2004/0069470 A1 | 4/2004 | Gorbulsky | |
| 2005/0150970 A1 | 7/2005 | Beutin et al. | |
| 2007/0240865 A1 | 10/2007 | Zhang et al. | |
| 2008/0014528 A1 | 1/2008 | Bailey et al. | |
| 2008/0095611 A1 | 4/2008 | Storage et al. | |
| 2008/0149313 A1 | 6/2008 | Slaughter | |
| 2009/0260786 A1 | 10/2009 | Palanchon | |
| 2010/0012289 A1 | 1/2010 | Haussmann | |
| 2010/0077794 A1 | 4/2010 | Higashiyama et al. | |
| 2010/0239793 A1 | 9/2010 | Andrews et al. | |
| 2011/0024093 A1 | 2/2011 | Shiraichi et al. | |
| 2011/0056652 A1 | 3/2011 | Neher et al. | |
| 2011/0180242 A1 | 7/2011 | Urata et al. | |
| 2012/0074150 A1 | 3/2012 | Wortmann et al. | |
| 2012/0141851 A1 | 6/2012 | Hou et al. | |
| 2012/0180478 A1 | 7/2012 | Johnson et al. | |
| 2012/0279242 A1 | 11/2012 | Seybold et al. | |
| 2012/0312502 A1 | 12/2012 | Metni et al. | |
| 2013/0020047 A1 | 1/2013 | Army, Jr. et al. | |
| 2013/0075054 A1 | 3/2013 | Fox et al. | |
| 2013/0140010 A1 | 6/2013 | Parfenov | |
| 2013/0152989 A1 | 6/2013 | Krinn et al. | |
| 2013/0180696 A1 | 7/2013 | Magee et al. | |

(56)          References Cited

U.S. PATENT DOCUMENTS

| | | |
|---|---|---|
| 2013/0236299 A1 | 9/2013 | Kington et al. |
| 2014/0027099 A1 | 1/2014 | Sispera et al. |
| 2014/0034028 A1 | 2/2014 | Zhang et al. |
| 2014/0116664 A1 | 5/2014 | Landre |
| 2014/0150735 A1 | 6/2014 | Caruzzi et al. |
| 2014/0154548 A1 | 6/2014 | Dillmann et al. |
| 2014/0166236 A1 | 6/2014 | Tan et al. |
| 2014/0208768 A1 | 7/2014 | Bacic |
| 2014/0328964 A1 | 11/2014 | Mark et al. |
| 2014/0360698 A1 | 12/2014 | Waldman et al. |
| 2015/0027669 A1 | 1/2015 | Kokas et al. |
| 2015/0053380 A1 | 2/2015 | Army, Jr. et al. |
| 2015/0101334 A1 | 4/2015 | Bond et al. |
| 2015/0114611 A1 | 4/2015 | Morris et al. |
| 2015/0128561 A1 | 5/2015 | Pesyna et al. |
| 2015/0129184 A1 | 5/2015 | Alhazmy |
| 2015/0168080 A1 | 6/2015 | Honma et al. |
| 2015/0176924 A1 | 6/2015 | Hu et al. |
| 2015/0192370 A1 | 7/2015 | Suzuki et al. |
| 2015/0241142 A1 | 8/2015 | Vallee et al. |
| 2015/0377135 A1 | 12/2015 | Kupiszewski |
| 2015/0377562 A1 | 12/2015 | Buckrell et al. |
| 2016/0010863 A1 | 1/2016 | Ott et al. |
| 2016/0108814 A1 | 4/2016 | Schmitz |
| 2016/0108815 A1 | 4/2016 | Schmitz et al. |
| 2016/0109130 A1 | 4/2016 | Stastny et al. |
| 2016/0116218 A1 | 4/2016 | Shedd et al. |
| 2016/0116222 A1 | 4/2016 | Shedd et al. |
| 2016/0131432 A1 | 5/2016 | Neumann et al. |
| 2016/0151860 A1 | 6/2016 | Engeli et al. |
| 2016/0175934 A1 | 6/2016 | Lacy et al. |
| 2016/0201998 A1 | 7/2016 | Kennedy et al. |
| 2016/0202003 A1 | 7/2016 | Gerstler et al. |
| 2016/0230595 A1 | 8/2016 | Wong et al. |
| 2016/0265850 A1 | 9/2016 | Kupiszewski et al. |
| 2016/0305713 A1 | 10/2016 | Fernandez et al. |
| 2016/0363387 A1 | 12/2016 | Stapleton |
| 2017/0205149 A1 | 7/2017 | Herring et al. |
| 2018/0038243 A1 | 2/2018 | Rambo et al. |
| 2018/0244127 A1 | 8/2018 | Sennoun et al. |
| 2019/0072035 A1 | 3/2019 | Peace et al. |
| 2019/0120562 A1 | 4/2019 | Fuller |
| 2019/0170050 A1 | 6/2019 | Uhrich et al. |
| 2019/0323433 A1 | 10/2019 | Bewick et al. |
| 2021/0025288 A1 | 1/2021 | Bordoni et al. |
| 2021/0108597 A1 | 4/2021 | Ostdiek et al. |
| 2021/0269168 A1 | 9/2021 | Shaner et al. |
| 2021/0363923 A1 | 11/2021 | Zysman et al. |

FOREIGN PATENT DOCUMENTS

| | | |
|---|---|---|
| EP | 0777094 A2 | 6/1997 |
| EP | 1098156 A1 | 5/2001 |
| EP | 2088371 A2 | 8/2009 |
| GB | 400557 A | 10/1933 |
| GB | 2217828 A | 11/1989 |
| JP | H11325753 A | 11/1999 |
| JP | 20010141674 A | 2/2001 |
| JP | 2004037020 A | 2/2004 |
| JP | 2006002622 A | 1/2006 |
| JP | 2019065834 A | 4/2019 |
| RU | 2535187 C1 | 12/2014 |

OTHER PUBLICATIONS

Co-Pending U.S. Appl. No. 18/071,743, filed Nov. 30, 2022.
Co-Pending U.S. Appl. No. 18/349,395, filed Jul. 10, 2023.
Naderi et al., Design and Performance Characterization of a Micro-pin-fin sCO2 Recuperator, Supercritical CO2 Power Cycles Symposium, Mar. 29, 2018, Pittsburg, 20 Pages. http://sco2symposium.com/papers2018/heat-exchangers/159_Pres.pdf.

* cited by examiner

GAS TURBINE ENGINE WITH HEAT EXCHANGER ASSEMBLY

FIELD

The present disclosure relates to a gas turbine engine and a heat exchanger assembly for the gas turbine engine.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly, and the fan assembly may be enclosed by an outer nacelle. The outer nacelle may define a bypass passage with the turbomachine.

Generally, improvements to a turbofan engine in the fields of thermal management and aerodynamics would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
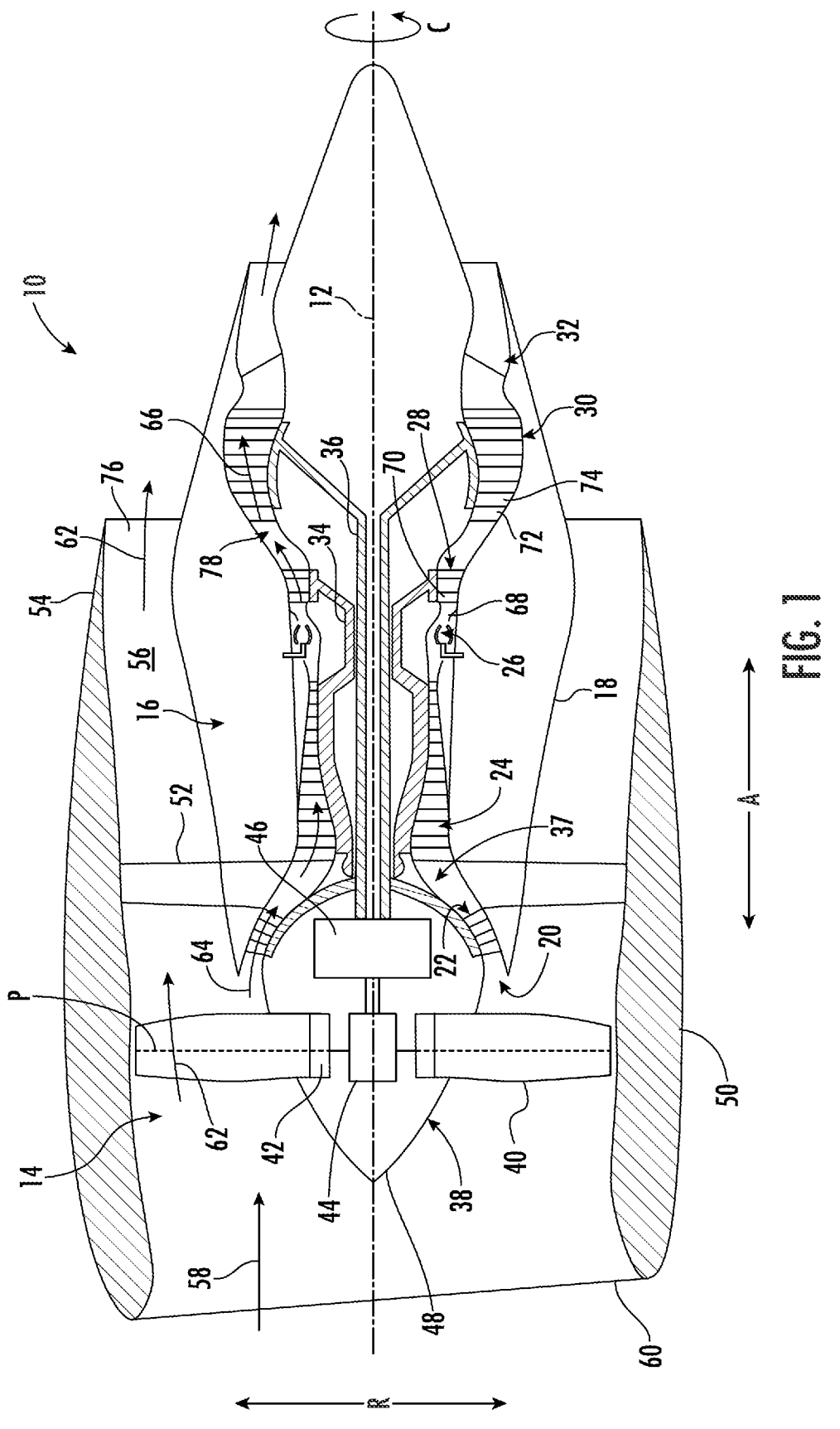
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The phrases "from X to Y" and "between X and Y" each refers to a range of values inclusive of the endpoints (i.e., refers to a range of values that includes both X and Y).

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The present disclosure is generally related to a heat exchanger assembly for a gas turbine engine. As design criteria for turbofan engines drives operating conditions to higher pressures and temperatures, it has been recognized that increased cooling capacity would be welcomed in the art. Certain gas turbine engines bleed air from, e.g., a high pressure compressor, and use the bleed air to cool various accessory systems of the turbofan engine. However, such a configuration may result in inefficiencies as the air bled from the high pressure compressor undergoes a relatively high amount of work, and further is generally at an elevated temperature.

Accordingly, in one exemplary aspect, a gas turbine engine is provided having a turbomachine that defines a cavity having a cavity inlet in airflow communication with a working gas flowpath of the turbomachine at a location upstream of a compressor section and a cavity outlet in airflow communication with a bypass passage. A heat exchanger assembly is provided in the cavity, and a heat exchanger of the heat exchanger assembly receives an airflow through the cavity. By transferring heat to the airflow, the heat exchanger may be utilized to cool one or more accessory systems of the gas turbine engine.

In such an exemplary aspect, the airflow provided to the heat exchanger may be relatively cool and may be provided from a location upstream of a significant amount of compression (which would result in lost work). Utilizing the cool air to cool the accessory systems improves operation of the gas turbine engine with few additional components.

Referring now to the drawings, wherein identical numerals indicate the same elements throughout the figures, FIG. 1 is a schematic cross-sectional view of a gas turbine engine 10 in accordance with an exemplary embodiment of the present disclosure. More particularly, for the embodiment of FIG. 1, the gas turbine engine 10 is a high-bypass turbofan jet engine, sometimes also referred to as a "turbofan engine." As shown in FIG. 1, the gas turbine engine 10 defines an axial direction A (extending parallel to a longitudinal centerline 12 provided for reference), a radial direction R, and a circumferential direction C extending about the longitudinal centerline 12. In general, the gas turbine engine 10 includes a fan section 14 and a turbomachine 16 disposed downstream from the fan section 14, the turbomachine 16 drivingly coupled to a fan 38 of the fan section 14.

The exemplary turbomachine 16 depicted generally includes a substantially tubular outer casing 18 that defines an annular turbomachine inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft 34 (which may additionally or alternatively be a spool) drivingly connects the HP turbine 28 to the HP compressor 24. A low pressure (LP) shaft 36 (which may additionally or alternatively be a spool) drivingly connects the LP turbine 30 to the LP compressor 22. The compressor section, combustion section 26, turbine section, and jet exhaust nozzle section 32 together define a working gas flowpath 37. In such a manner, it will be appreciated that the turbomachine inlet 20 is an inlet to the working gas flowpath 37.

In the embodiment shown, the turbomachine inlet 20 is positioned immediately downstream of the fan 38 (i.e., no intervening structure, such as blades, vanes, or struts, therebetween). Further, it will be appreciated that for the embodiment depicted, the LP compressor 22 is located downstream of the fan 38, and there are no intermediate stages of compression between the fan 38 and the LP compressor 22.

For the embodiment depicted, the fan section 14 includes a fan 38 having a plurality of fan blades 40 coupled to a disk 42 in a spaced apart manner. As depicted, the fan 38 is a single stage fan and the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40, e.g., in unison. The gas turbine engine 10 further includes a reduction gearbox 46, and the fan blades 40, disk 42, and pitch change mechanism 44 are together rotatable about the longitudinal centerline 12 by LP shaft 36 across the reduction gearbox 46. The reduction gearbox 46 includes a plurality of gears for adjusting a rotational speed of the fan 38 relative to a rotational speed of the LP shaft 36, such that the fan 38 may rotate at a more efficient fan speed.

Referring still to the exemplary embodiment of FIG. 1, the disk 42 is covered by a rotatable front hub 48 of the fan section 14 (sometimes also referred to as a "spinner"). The front hub 48 is aerodynamically contoured to promote an airflow through the plurality of fan blades 40.

Additionally, the exemplary fan section 14 includes an annular fan casing or outer nacelle 50 that circumferentially surrounds the fan 38 and/or at least a portion of the turbomachine 16. It should be appreciated that the outer nacelle 50 is supported relative to the turbomachine 16 by a plurality of circumferentially-spaced outlet guide vanes 52 in the embodiment depicted. Moreover, a downstream section 54 of the outer nacelle 50 extends over an outer portion of the turbomachine 16 so as to define a bypass passage 56 therebetween. The bypass passage 56 is defined at least partially over the turbomachine 16.

During operation of the gas turbine engine 10, a volume of air 58 enters the gas turbine engine 10 through an associated inlet 60 of the outer nacelle 50 and fan section 14. As the volume of air 58 passes across the fan blades 40, a first portion 62 of air 58 is directed or routed into the bypass passage 56 and a second portion 64 of air is directed or routed into the working gas flowpath 37, or more specifically into the LP compressor 22. The ratio between the first portion 62 of air 58 and the second portion 64 of air 58 is commonly known as a bypass ratio. A pressure of the second portion 64 of air 58 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion 62 of air 58 is substantially increased as the first portion 62 of air 58 is routed through the bypass passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary gas turbine engine 10 depicted in FIG. 1 is by way of example only, and that in other exemplary embodiments, the gas turbine engine 10 may have any other suitable configuration. For example, although the gas turbine engine 10 depicted is configured as a ducted gas turbine engine (i.e., including the outer nacelle 50), in other embodiments, the gas turbine engine 10 may be an unducted gas turbine engine (such that the fan 38 is an unducted fan, and the outlet guide vanes 52 are cantilevered from the outer casing 18). Additionally, or alternatively, although the gas turbine engine 10 depicted is configured as a geared gas turbine engine (i.e., including the reduction gearbox 46) and a variable pitch gas turbine engine (i.e., including a fan 38 configured as a variable pitch fan), in other embodiments, the gas turbine engine 10 may additionally or alternatively be configured as a direct drive gas turbine engine (such that the LP shaft 36 rotates at the same speed as the fan 38), as a fixed pitch gas turbine engine (such that the fan 38 includes fan blades 40 that are not rotatable about a pitch axis P), or both. It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

Figure 2:
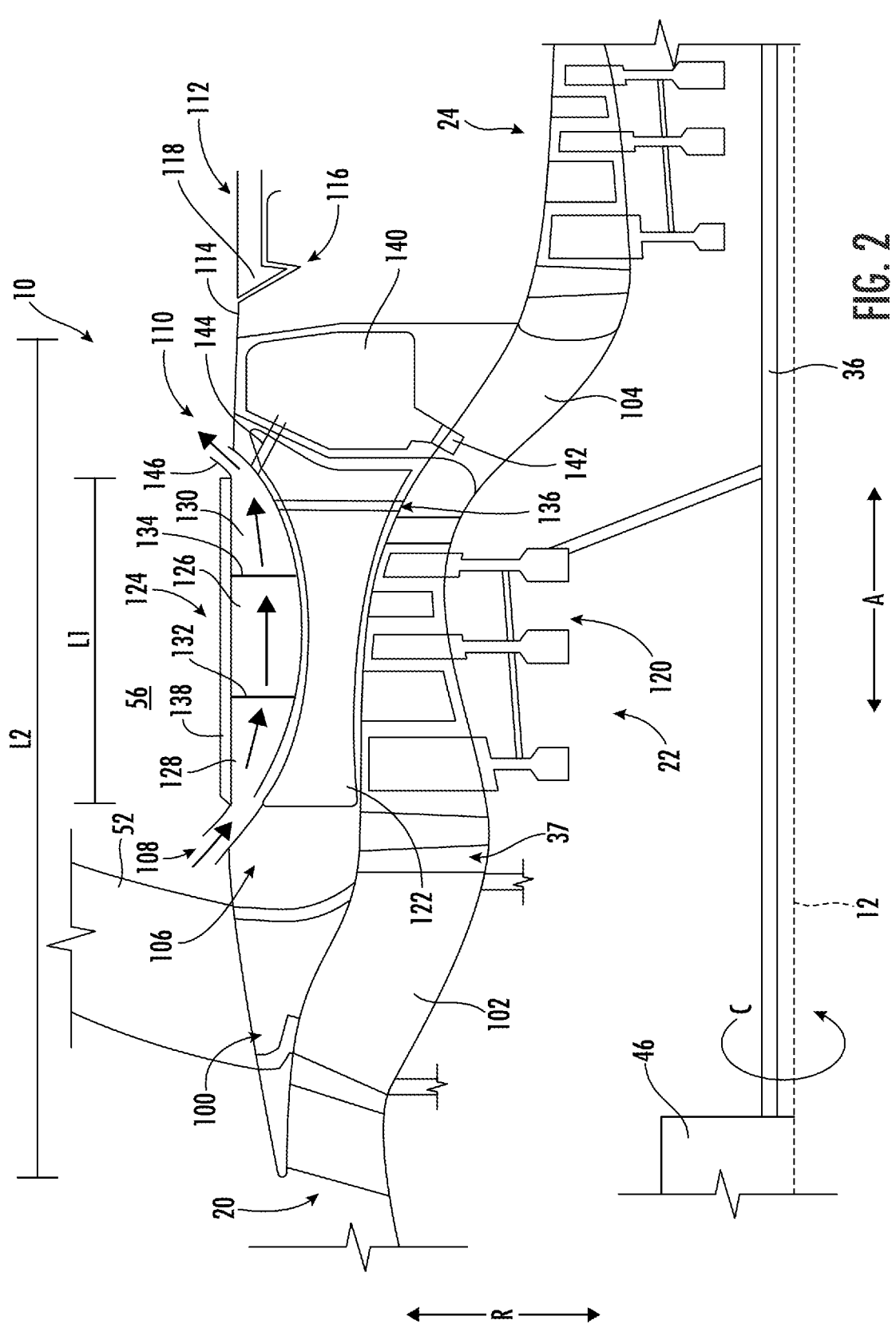
FIG. 2 is a schematic view of a portion of the gas turbine engine of FIG. 1 including a turbomachine and a core cowl.

Referring now to FIG. 2, a close-up, schematic view is depicted of a portion of the exemplary gas turbine engine 10 of FIG. 1. In particular, the view of FIG. 2 is a close-up of the turbomachine 16 of FIG. 1, depicting the turbomachine inlet 20, the compressor section including the LP compressor 22 and the HP compressor 24, the LP shaft 36, and the reduction gearbox 46. Further, the outer casing 18 of the turbomachine 16 is depicted extending around at least a portion of the compressor section, with the bypass passage 56 defined in part thereby.

As will be appreciated from the view of FIG. 2, the turbomachine 16 further includes a frame 100. The frame 100 includes a strut 102 extending through the working gas flowpath 37 at a location upstream of the LP compressor 22 and downstream of the turbomachine inlet 20 and a strut 104 extending through the working gas flowpath 37 at a location downstream of the LP compressor 22 and upstream of the HP compressor 24. The frame 100 may provide structural support to various components of the gas turbine engine 10.

The frame 100 defines a cavity 106 outward in the radial direction R from the LP compressor 22. The cavity 106 includes a flowpath inlet 108 that is in fluid communication with the bypass passage 56 and a flowpath outlet 110 that is in fluid communication with the bypass passage 56. Cool air from the bypass passage 56 can flow in through the flowpath inlet 108 into the cavity 106 and out through the flowpath outlet 110 back to the bypass passage 56, thereby defining a cooling air flowpath.

The gas turbine engine 10 includes a core cowl 112. The core cowl 112 is a portion of the gas turbine engine 10 that encloses a core stream. The core stream flows through the HP compressor 24 to the HP turbine 28. The frame 100 includes a connector 114 that engages the core cowl 112. The connector 114 may define a circumferential groove 116, and the core cowl 112 may include a wedge 118 that fits in the circumferential groove 116, securing the core cowl 112 to the turbomachine 16. In the exemplary embodiment of FIG. 2, the circumferential groove 116 has a V-shape, and it will be appreciated that the circumferential groove 116 may have any suitable shape.

The gas turbine engine 10 includes a booster 120. The booster 120 provides additional power to air in the working gas flowpath 37. In FIG. 2, the booster 120 includes the LP compressor 22. In general, the booster 120 increases one or more of a speed, a pressure, or a temperature of the air in the working gas flowpath 37. The booster 120 thus "boosts" the air toward the HP compressor 24.

The turbomachine 16 includes a booster cowl 122. The booster cowl 122 is disposed in the cavity 106 and extends around the booster 120 in the circumferential direction C. In general, the booster cowl 122 may be shaped according to the contour of the frame 100 proximate to the LP compressor 22.

The gas turbine engine 10 includes a heat exchanger assembly 124 disposed in the cooling air flowpath. The heat exchanger assembly 124 includes a heat exchanger 126, a diffusion section 128, and an exhaust section 130. The heat exchanger assembly 124 uses cooling air from the bypass passage 56 to extract heat from other components of the gas turbine engine 10, including one or more accessory systems including an oil lubrication system, a fuel delivery system, a cooled cooling air (CCA) system, or an engine controller cooling system. Then, the heat exchanger assembly 124 expels the heated air into the bypass passage 56.

The heat exchanger assembly 124 is positioned in the gas turbine engine 10 to address space constraints in the axial direction A. The heat exchanger assembly 124 is disposed aft of the fan 38 in the axial direction A and forward of the core cowl 112 in the axial direction A. Specifically, the heat exchanger assembly 124 is disposed aft of the outlet guide vane 52 in the axial direction A and forward of the connector 114 in the axial direction A. By positioning the heat exchanger assembly 124 between the outlet guide vane 52 and the core cowl 112, the heat exchanger assembly 124 can utilize space within the cavity 106 to collect cool air from the working gas flowpath 37 that has not yet been compressed (thereby increasing the temperature of the air) by the booster 120.

The heat exchanger assembly 124 is disposed in the gas turbine engine 10 to address space constraints in the radial direction R. As shown in FIG. 2, the heat exchanger assembly 124 is disposed outward of the booster 120 in the radial direction R. Specifically, the heat exchanger assembly 124 is disposed in the cavity 106, and the booster cowl 122 is disposed between the LP compressor 22 and the heat exchanger assembly 124. By positioning the heat exchanger assembly 124 outward of the booster cowl 122 adjacent to the bypass passage 56, the heat exchanger assembly 124 can directly expel the heated air through the flowpath outlet 110 and into the bypass passage 56, improving cooling of accessory systems by the heat exchanger assembly 124.

The heat exchanger assembly 124 includes the heat exchanger 126. The heat exchanger 126 includes an inlet 132 and an exit 134. The inlet 132 receives cool air from the cooing air flowpath, and the exit 134 expels heated air into the cavity. The heat exchanger 126 may be any suitable type, such as an air-cooled oil cooler, a variable frequency generator air-cooled oil cooler, an air-air heat exchanger, or an air cooled fluid cooler. That is, the heat exchanger 126 may use the air as a working fluid that absorbs heat from hot oil. The cooled oil then leaves the heat exchanger to return to other components.

The heat exchanger assembly 124 includes the diffusion section 128. The diffusion section 128 is in fluid communication with the inlet 132 of the heat exchanger 126. The diffusion section 128 is configured to reduce a speed of air in the cavity 106 flowing to the inlet 132, which reduces the pressure drop across the heat exchanger 126, improving efficiency of the heat exchanger 126. The diffusion section 128 is in airflow communication with the bypass passage 56 at the flowpath inlet 108.

The heat exchanger assembly 124 includes the exhaust section 130. The exhaust section 130 fluidly connects the exit 134 and the bypass passage 56. That is, the exhaust section 130 directs air heated by the heat exchanger 126 to the bypass passage 56. The exhaust section 130 is configured to accelerate the air, such as by compression, flowing from the exit 134 to the bypass passage 56, further increasing the temperature of the air. The booster 120 may be in fluid communication with the exhaust section 130, and the exhaust section 130 may be configured to accelerate the air from the exit 134 with an airflow from booster 120. More specifically, the booster 120 may provide an airflow 136, when compressed with the air from the heat exchanger 126, may assist in driving the air through the flowpath outlet 110 and into the bypass passage 56. As a result, pressure in the exhaust section 130 may decrease, which may drive more air into the inlet 132 of the heat exchanger 126, improving operation of the heat exchanger 126.

The heat exchanger assembly 124 includes a heat exchanger cowl 138 disposed outward in the radial direction R of the heat exchanger 126, the diffusion section 128, and the exhaust section 130. The heat exchanger cowl 138 provides an outward surface that is exposed to the bypass passage 56, defining the cooling air flowpath beneath. The heat exchanger cowl 138 has a length $L_1$ in the axial direction A, and the turbomachine 16 defines a length $L_2$ in the axial direction A from the turbomachine inlet 20 to the core cowl 112. The length $L_1$ of the heat exchanger cowl 138 may be determined as a specific percentage of the length $L_2$, such as from 10% to 60%. That is, in one form, the length $L_1$ of the heat exchanger cowl may be $0.10L_2 \leq L_1 \leq 0.60L_2$.

The gas turbine engine 10 may include a variable bleed assembly 140. The variable bleed assembly 140 is disposed aft of the exhaust section 130 in the axial direction A. The variable bleed assembly 140 may be in fluid communication with the exhaust section 130 to direct air from the working gas flowpath 37 downstream of the LP compressor 22 to the bypass passage 56. More specifically, the variable bleed assembly 140 includes a variable bleed inlet 142 that receives air from the working gas flowpath 37 and a variable bleed outlet 144 that provides the air to the exhaust section 130. The variable bleed assembly 140 may further accelerate the air in the exhaust section 130 prior to exiting into the bypass passage 56.

The exhaust section 130 may include an ejector 146. The ejector 146 moves the cooling air in the exhaust section 130 through the flowpath outlet 110 and into the bypass passage 56. More specifically, the ejector 146 increases the pressure of the cooling air in order to drive the cooling air out from the heat exchanger 126 and into the bypass passage 56.

Figure 3:
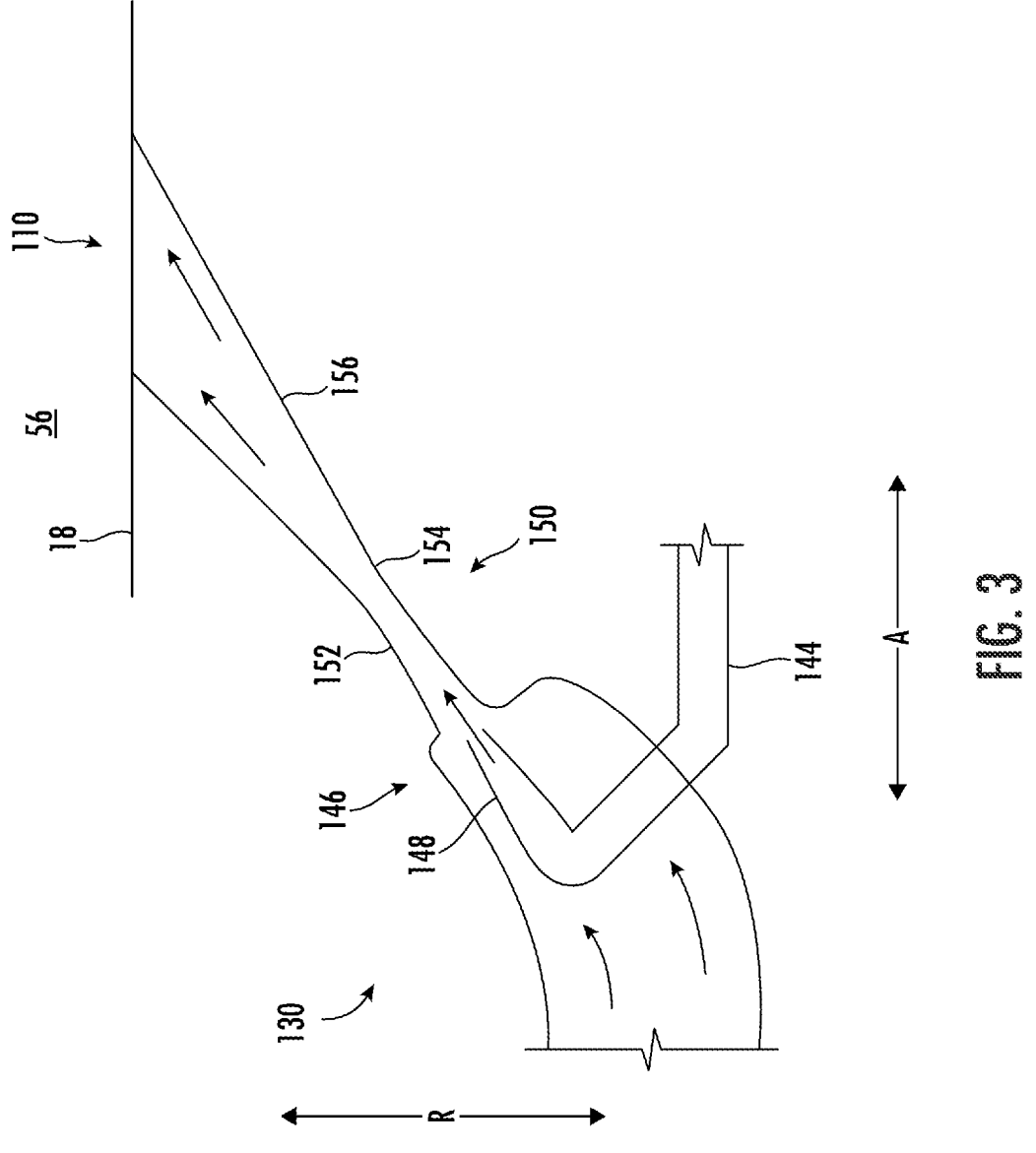
FIG. 3 is a detailed schematic view of a portion of the turbomachine of FIG. 2.

Now referring to FIG. 3, a magnified view of the ejector 146 is shown. The variable bleed outlet 144 includes a fluid nozzle 148 configured to provide a relatively high pressure fluid flow. Further, the ejector 146 includes a nozzle portion 150 that includes a converging inlet nozzle 152, a diffusion throat 154, and a diverging outlet diffusion 156 arranged in serial order, with the fluid nozzle 148 of the variable bleed outlet 144 oriented to provide the relatively high pressure fluid into the converging inlet nozzle 152. As will be appreciated, the variable bleed assembly 140 acts as a high pressure air source that provides the high pressure fluid flow through the fluid nozzle 148 with the nozzle portion 150 located downstream. Such a high pressure fluid flow may urge a relatively low pressure fluid flow therethrough to increase the amount of airflow through the exhaust section 130 and to the bypass passage 56.

Figure 4:
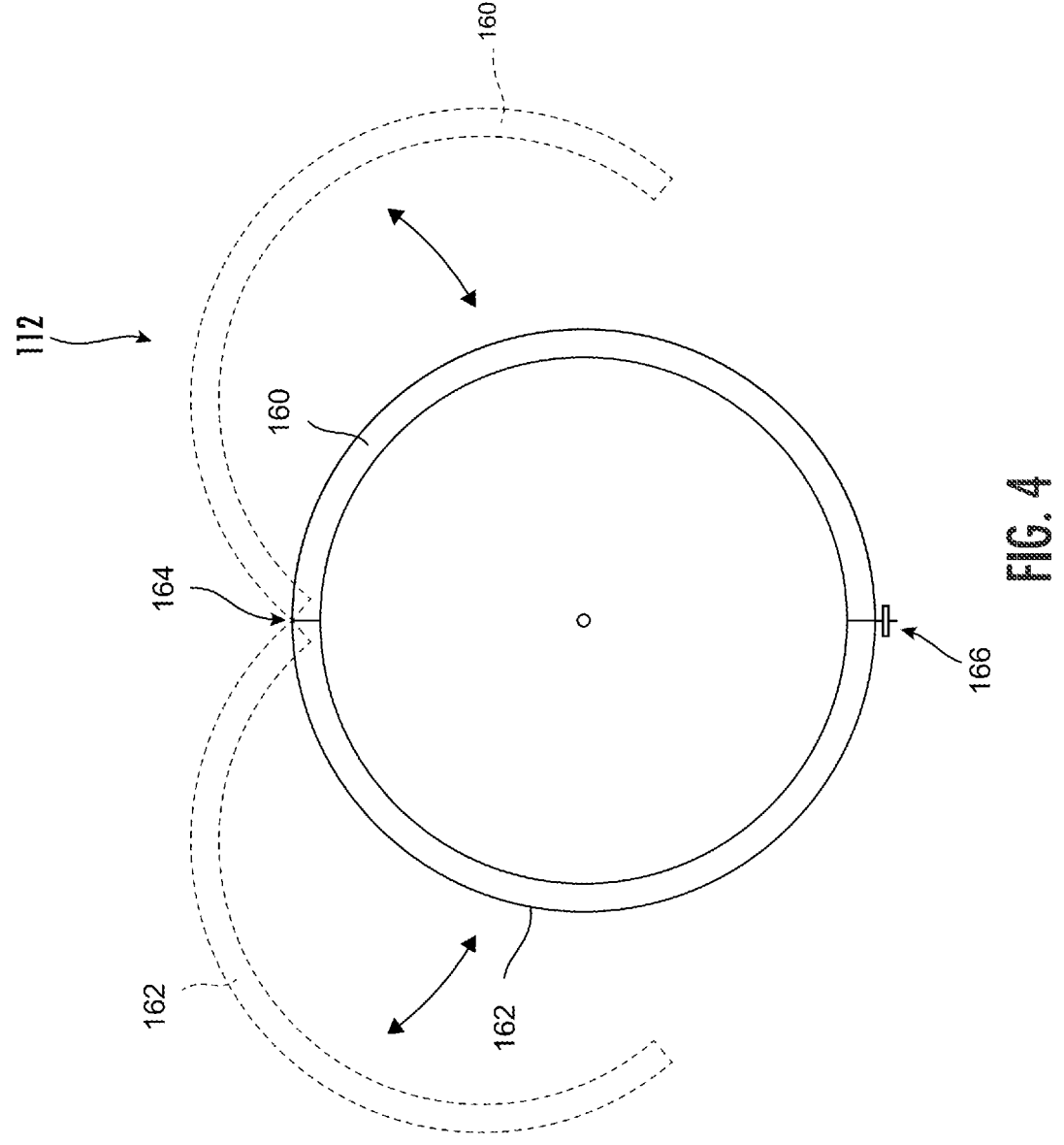
FIG. 4 is a front view of the core cowl of FIG. 2.

With reference to FIG. 4, a schematic view of the core cowl 112 is provided. The core cowl 112 includes a first member 160 and a second member 162. The first member 160 and the second member 162 together extend substantially 360° when coupled together. In order to install, e.g., the core cowl 112 into the circumferential groove 116 of the frame 100 (see FIG. 2), the first member 160 and the second member 162 of the core cowl 112 may be individually installed (as is depicted in phantom in FIG. 4).

In such a manner, it will be appreciated that the first member 160 and the second member 162 may together define a hinged connection 164 (e.g., any mechanical connection that allows for the first member to pivot relative to the second member, such as a pinned connection) on one side and a releasable mechanical connection 166 (i.e., any mechanical connection that allows for a release without damaging the connection during a normal course, such as a bolted connection, a ratcheted connection, a latched connection, or the like) on an opposite side.

It will be appreciated, however, that in other exemplary embodiments, the core cowl 112 may be configured in any other suitable manner. For example, in other embodiments, the core cowl 112 may utilize any other suitable mechanical connection, such as, e.g., bolts, screws, rivets, welding, complementary geometries (e.g., dovetails), etc.

Figure 5:
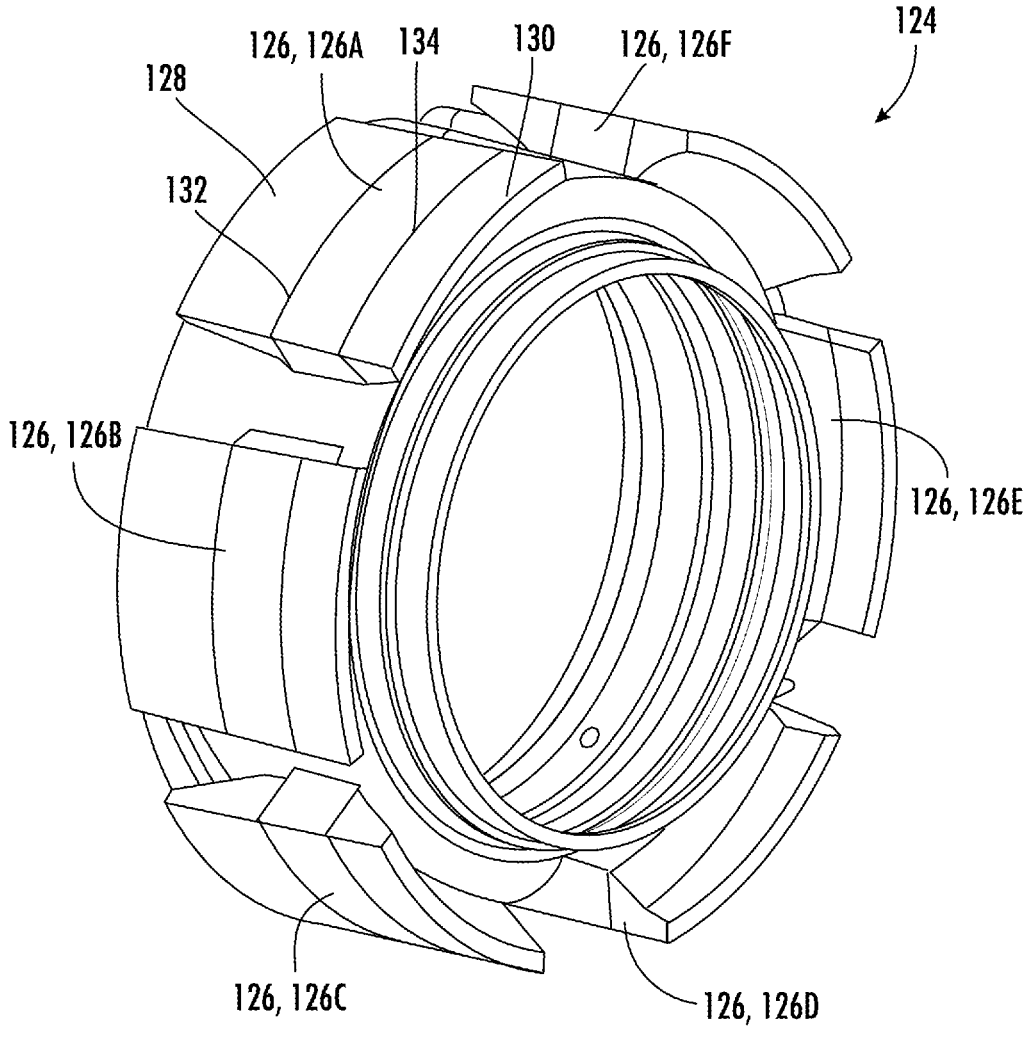
FIG. 5 is a perspective schematic view of a heat exchanger assembly in accordance with an exemplary embodiment of the present disclosure.
Figure 6:
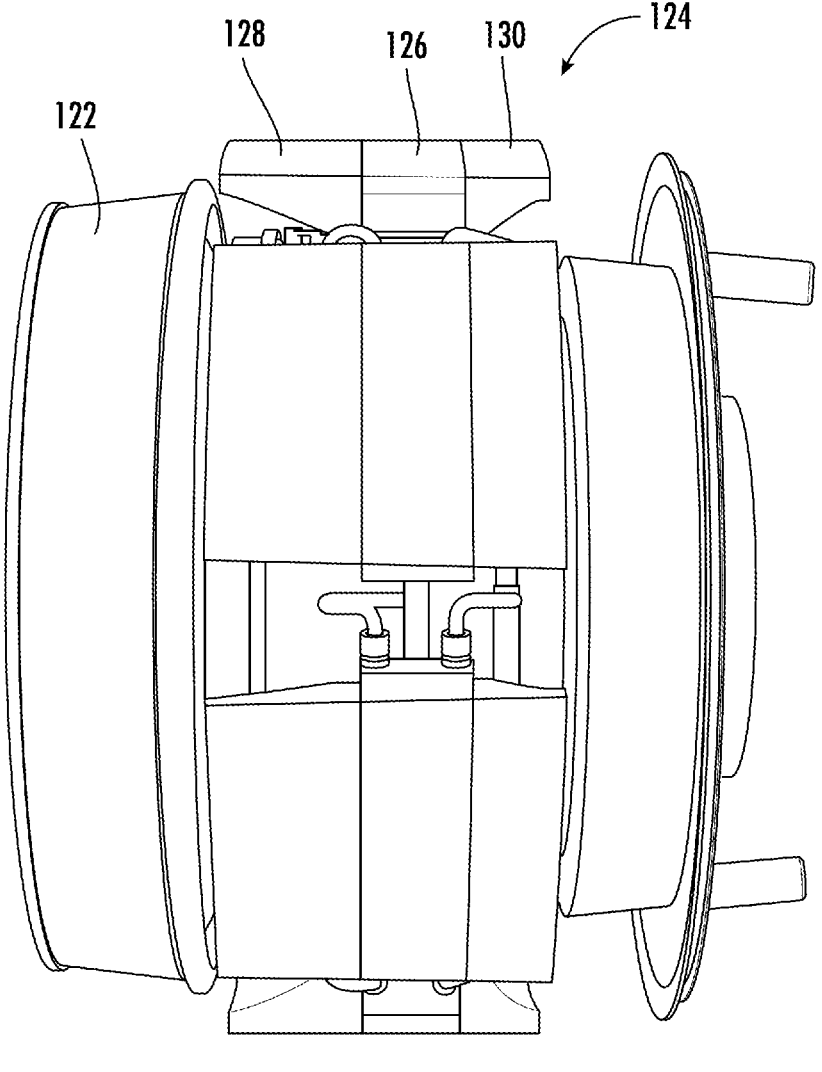
FIG. 6 is a side view of the heat exchanger assembly of FIG. 5.
Figure 7:
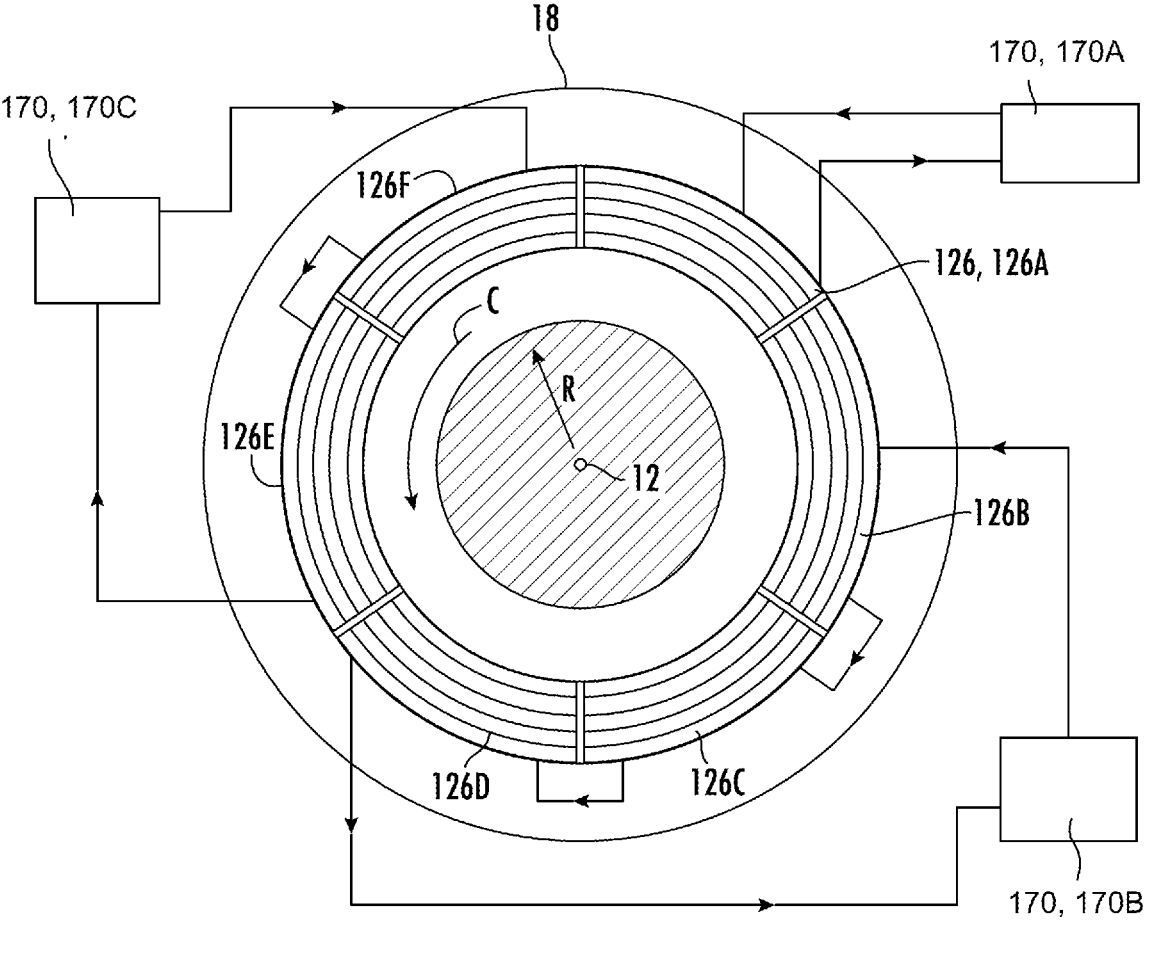
FIG. 7 is a front view of the heat exchanger assembly of FIG. 5.

Now referring to FIGS. 5-7, a magnified view of the heat exchanger assembly 124 is shown. FIG. 5 is a perspective schematic view of the heat exchanger assembly 124. FIG. 6 is a side schematic view of the heat exchanger assembly 124. FIG. 7 is a front schematic view of the heat exchanger assembly 124.

As best shown in FIG. 5, the heat exchanger assembly 124 includes a plurality of heat exchangers 126. Each one of the plurality of heat exchangers 126 includes an inlet 132 and an exit 134, only one of each is numbered in FIGS. 3-5 for clarity. Each heat exchanger 126 receives cool air in the inlet 132 and expels heated air out from the exit 134. FIG. 3 shows six heat exchangers 126A, 126B, 126C, 126D, 126E, 126F (collectively, "heat exchangers 126"), but it will be appreciated that the heat exchanger assembly 124 may include a different number of heat exchangers 126, including at least two and as many as twenty.

As best shown in FIGS. 6-7, The plurality of heat exchangers 126 are disposed in the cavity 106 (FIG. 2) along the circumferential direction C around the turbomachine 16. Specifically, the plurality of heat exchangers 126 are disposed around the booster cowl 122. The arrangement of the plurality of heat exchangers 126 around the booster cowl 122 allows for cooling of the accessory systems at different locations in the circumferential direction C.

Referring back to FIG. 5, the heat exchanger assembly 124 includes a plurality of diffusion sections 128, only one of which is numbered for clarity. Each of the plurality of heat exchangers 126 is in fluid communication with at least one of the plurality of diffusion sections 128. More specifically, the inlet 132 of each of the plurality of heat exchangers 126 receives air diffused by at least one of the plurality of diffusion sections 128. The diffusion sections 128 may be arranged in the circumferential direction C such that each of the diffusion sections 128 is fluidly connected to one of the plurality of heat exchangers 126. In such an arrangement, the diffusion sections 128 receive air flowing through the cooling air flowpath.

The heat exchanger assembly 124 includes a plurality of exhaust sections 130, only one of which is numbered for clarity. Each of the plurality of heat exchangers 126 is in fluid communication with at least one of the plurality of exhaust sections 130. More specifically, the exit 134 of each of the plurality of heat exchangers 126 transmits air heated by the heat exchanger 126 to the exhaust sections 130. The exhaust sections 130 may be arranged in the circumferential direction C such that each of the exhaust sections 130 is fluidly connected to one of the plurality of heat exchangers 126. Each exhaust section 130 is in fluid communication with the bypass passage 56 to expel the heated air.

As shown in FIG. 7, the heat exchanger assembly 124 includes at least one heat source 170 in thermal communication with the heat exchanger 126. The heat source 170 provides a heated fluid (such as oil) to the heat exchanger 126 in order to transfer heat from the heated fluid to the air flowing through the heat exchanger 126. The heat source 170 may be one of the accessory systems described above, or an intermediate system that flows an unheated working fluid to the accessory systems to receive heat and then flows the heated working fluid to the heat exchanger 126 to expel the heat. The heat exchanger assembly 124 may include more than one heat source 170 to accommodate space constraints and positions of the accessory systems. For example, as shown in FIG. 7, the heat exchanger assembly 124 may include three heat sources 170A, 170B, 170C.

Figure 8:
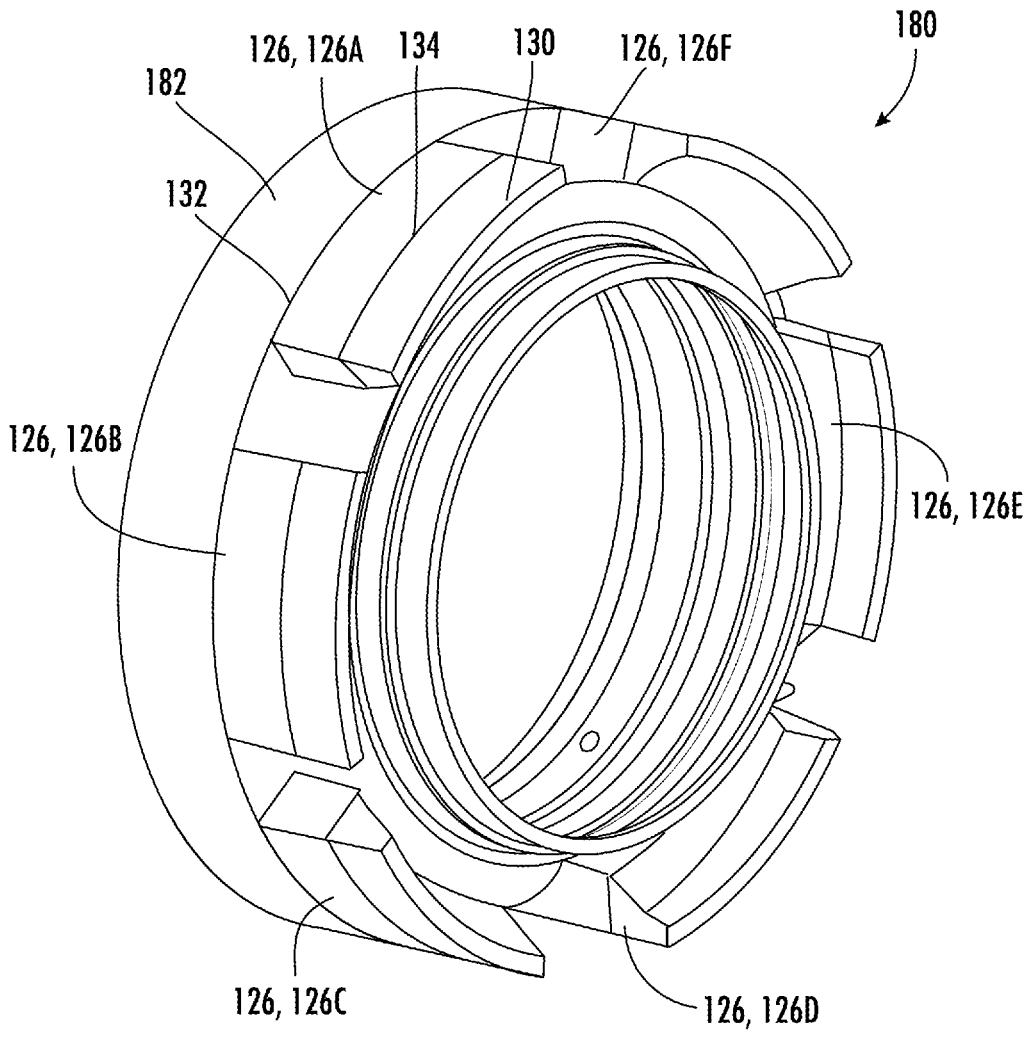
FIG. 8 is a perspective schematic view of another heat exchanger assembly in accordance with an exemplary embodiment of the present disclosure.

The heat exchanger assembly shown in FIGS. 5-7 includes a plurality of heat exchangers 126 each with a single respective diffusion section 128. However, it will be appreciated that different arrangements and shapes of heat exchanger and diffusion sections may be implemented. As one example, FIG. 8 shows a perspective view of a heat exchanger assembly 180 with a single diffusion section 182 that extends circumferentially in an annular shape. The diffusion section 182 extends 360 degrees around the longitudinal centerline 12 of the gas turbine engine 10 (FIG. 1). The single diffusion section 182 provides air to each of the heat exchangers 126, separating the air to each of the discrete heat exchanger 126.

Figure 9:
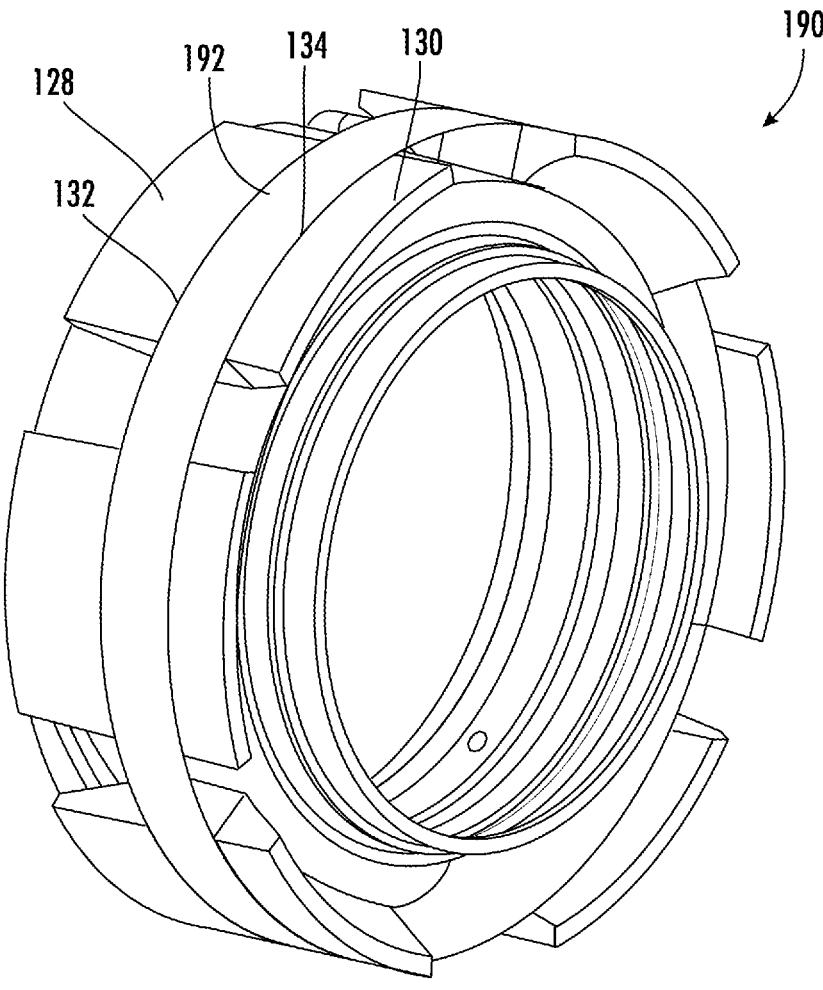
FIG. 9 is a perspective schematic view of a heat exchanger assembly in accordance with an exemplary embodiment of the present disclosure.

As another example, FIG. 9 shows a perspective view of a heat exchanger assembly 190 with a single heat exchanger 192 that extends circumferentially 360 degrees around the longitudinal centerline 12 of the gas turbine engine 10 (FIG. 1). The discrete diffusion sections 128 provide air to the heat exchanger 192, and air flows within the entire heat exchanger 192 for heat transfer to the accessory systems.

Further aspects are provided by the subject matter of the following clauses:

A gas turbine engine defining a radial direction and an axial direction, the gas turbine engine including a fan assembly including a fan, a turbomachine drivingly coupled to the fan and including a compressor section, a combustion section, and a turbine section arranged in serial flow order and defining in part a working gas flowpath, the gas turbine engine defining a bypass passage over the turbomachine, a core cowl, and a heat exchanger assembly disposed aft of the fan in the axial direction and forward of the core cowl in the axial direction, the heat exchanger assembly including a heat exchanger, and a heat exchanger cowl defining a cooling air flowpath extending between a flowpath inlet in airflow communication with the bypass passage to receive a cooling airflow from the bypass passage and a flowpath outlet in airflow communication with the bypass passage to exhaust the cooling airflow back to the bypass passage, the heat exchanger positioned within the cooling air flowpath, the cooling air flowpath including a diffusion section located between the flowpath inlet and the heat exchanger.

The gas turbine engine of any of the preceding clauses, wherein the cooling air flowpath further defines an exhaust section located between the heat exchanger and the flowpath outlet.

The gas turbine engine of any of the preceding clauses, wherein the turbomachine includes an ejector positioned in airflow communication with the exhaust section, wherein the ejector is in airflow communication with a high pressure air source.

The gas turbine engine of any of the preceding clauses, wherein the compressor section includes a low pressure compressor and a high pressure compressor, wherein the turbomachine further includes a variable bleed assembly disposed downstream of the low pressure compressor and upstream of the high pressure compressor, wherein the high pressure air source is the variable bleed assembly.

The gas turbine engine of any of the preceding clauses, wherein the compressor section of the turbomachine includes a booster, wherein the heat exchanger is disposed outward of the booster in the radial direction.

The gas turbine engine of any of the preceding clauses, further including a booster cowl, wherein the booster cowl is disposed between the booster and the heat exchanger assembly in the radial direction.

The gas turbine engine of any of the preceding clauses, wherein the fan further includes an outlet guide vane, and wherein the heat exchanger assembly is disposed aft of the outlet guide vane in the axial direction.

The gas turbine engine of any of the preceding clauses, wherein the turbomachine includes a circumferential groove, wherein the core cowl includes a first member, a second member, and a hinged connection therebetween, wherein the first member and second member are coupled to the circumferential groove, and wherein the heat exchanger assembly is disposed forward of the circumferential groove in the axial direction.

The gas turbine engine of any of the preceding clauses, wherein the heat exchanger is a first heat exchanger of a plurality of heat exchangers of the heat exchanger assembly.

The gas turbine engine of any of the preceding clauses, wherein the heat exchanger cowl is a first heat exchanger cowl of a plurality of heat exchanger cowls of the heat exchanger assembly, wherein the cooling air flowpath is a first cooling air flowpath of a plurality of cooling air flowpaths of the heat exchanger assembly, and wherein each cooling air flowpath of the plurality of cooling air flowpaths is defined by a respective one of the plurality of heat exchanger cowls.

The gas turbine engine of any of the preceding clauses, further defining a circumferential direction, and wherein the plurality of heat exchanger cowls and plurality of heat exchangers are arranged in the circumferential direction.

The gas turbine engine of any of the preceding clauses, further including a heat source in thermal communication with the plurality of heat exchangers.

The gas turbine engine of any of the preceding clauses, wherein the plurality of heat exchangers includes at least two heat exchangers and less than or equal to 20 heat exchangers.

The gas turbine engine of any of the preceding clauses, wherein the heat exchanger is one of an air-cooled oil cooler, a variable frequency generator air-cooled oil cooler, or air-air heat exchanger, or an air-cooled fluid cooler.

The gas turbine engine of any of the preceding clauses, wherein the heat exchanger assembly further includes a heat source in thermal communication with the heat exchanger.

The gas turbine engine of any of the preceding clauses, wherein the diffusion section is configured to reduce a speed of air flowing to the inlet.

The gas turbine engine of any of the preceding clauses, wherein the cooling air flowpath further defines an exhaust section located between the heat exchanger and the flowpath outlet, wherein the exhaust section is configured to accelerate the cooling airflow from the heat exchanger provided to the bypass passage.

The gas turbine engine of any of the preceding clauses, wherein the fan is a single stage fan.

The gas turbine engine of any of the preceding clauses, wherein the turbomachine defines an inlet to the working gas flowpath and includes a circumferential groove for mounting at least a portion of the core cowl, wherein the heat exchanger cowl defines a first length along the axial direction from the flowpath inlet to the flowpath outlet, wherein the turbomachine defines a second length along the axial direction from the inlet to the circumferential groove, and wherein L1 is greater than or equal to 10% of L2 and is less than or equal to 60% of L2.

The gas turbine engine of any of the preceding clauses, wherein L1 is greater than or equal to 20% of L2 and is less than or equal to 50% of L2.

The gas turbine engine of any of the preceding clauses, wherein the diffusion section extends 360 degrees around a longitudinal centerline of the gas turbine engine.

The gas turbine engine of any of the preceding clauses, wherein the heat exchanger extends 360 degrees around a longitudinal centerline of the gas turbine engine.

A heat exchanger assembly is disposed aft of the fan in the axial direction and forward of the core cowl in the axial direction, the heat exchanger assembly including a heat exchanger and a heat exchanger cowl defining a cooling air flowpath extending between a flowpath inlet in airflow communication with the bypass passage to receive a cooling airflow from the bypass passage and a flowpath outlet in airflow communication with the bypass passage to exhaust the cooling airflow back to the bypass passage, the heat exchanger positioned within the cooling air flowpath, the cooling air flowpath including a diffusion section located between the flowpath inlet and the heat exchanger.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining a radial direction and an axial direction, the gas turbine engine comprising:
  a fan assembly comprising a fan;
  a turbomachine drivingly coupled to the fan and comprising a compressor section, a combustion section, and a turbine section arranged in serial flow order and defining in part a working gas flowpath, the gas turbine engine defining a bypass passage over the turbomachine;
  a core cowl; and
  a heat exchanger assembly disposed aft of the fan in the axial direction and forward of the core cowl in the axial direction, the heat exchanger assembly comprising:
    a heat exchanger; and
    a heat exchanger cowl defining a cooling air flowpath extending between a flowpath inlet in airflow communication with the bypass passage to receive a cooling airflow from the bypass passage and a flowpath outlet in airflow communication with the bypass passage to exhaust the cooling airflow back to the bypass passage, the heat exchanger positioned within the cooling air flowpath, the cooling air flowpath comprising a diffusion section located between the flowpath inlet and the heat exchanger;
  wherein the turbomachine defines an inlet to the working gas flowpath and defines a circumferential groove for mounting at least a portion of the core cowl, wherein the heat exchanger cowl defines a first length along the axial direction from the flowpath inlet to the flowpath outlet, wherein the turbomachine defines a second length along the axial direction from the inlet to the circumferential groove, and wherein L1 is greater than or equal to 10% of L2 and is less than or equal to 60% of L2.

2. The gas turbine engine of claim 1, wherein the cooling air flowpath further defines an exhaust section located between the heat exchanger and the flowpath outlet.

3. The gas turbine engine of claim 2, wherein the turbomachine comprises an ejector positioned in airflow communication with the exhaust section, wherein the ejector is in airflow communication with a high pressure air source.

4. The gas turbine engine of claim 3, wherein the compressor section comprises a low pressure compressor and a high pressure compressor, wherein the turbomachine further comprises a variable bleed assembly disposed downstream of the low pressure compressor and upstream of the high pressure compressor, wherein the high pressure air source is the variable bleed assembly.

5. The gas turbine engine of claim 1, wherein the compressor section of the turbomachine comprises a booster, wherein the heat exchanger is disposed outward of the booster in the radial direction.

6. The gas turbine engine of claim 5, further comprising a booster cowl, wherein the booster cowl is disposed between the booster and the heat exchanger assembly in the radial direction.

7. The gas turbine engine of claim 1, wherein the fan further comprises an outlet guide vane, and wherein the heat exchanger assembly is disposed aft of the outlet guide vane in the axial direction.

8. The gas turbine engine of claim 1, wherein the core cowl comprises a first member, a second member, and a hinged connection therebetween, wherein the first member and the second member are coupled to the circumferential groove, and wherein the heat exchanger assembly is disposed forward of the circumferential groove in the axial direction.

9. The gas turbine engine of claim 1, wherein the heat exchanger is a first heat exchanger of a plurality of heat exchangers of the heat exchanger assembly.

10. The gas turbine engine of claim 9, wherein the heat exchanger cowl is a first heat exchanger cowl of a plurality of heat exchanger cowls of the heat exchanger assembly, wherein the cooling air flowpath is a first cooling air flowpath of a plurality of cooling air flowpaths of the heat exchanger assembly, and wherein each cooling air flowpath of the plurality of cooling air flowpaths is defined by a respective one of the plurality of heat exchanger cowls.

11. The gas turbine engine of claim 10, further defining a circumferential direction, and wherein the plurality of heat exchanger cowls and the plurality of heat exchangers are arranged in the circumferential direction.

12. The gas turbine engine of claim 9, further comprising a heat source in thermal communication with the plurality of heat exchangers.

13. The gas turbine engine of claim 9, wherein the plurality of heat exchangers includes at least two heat exchangers and less than or equal to 20 heat exchangers.

14. The gas turbine engine of claim 1, wherein the heat exchanger is one of an air-cooled oil cooler, a variable frequency generator air-cooled oil cooler, or air-air heat exchanger, or an air-cooled fluid cooler.

15. The gas turbine engine of claim 1, wherein the heat exchanger assembly further comprises a heat source in thermal communication with the heat exchanger.

16. The gas turbine engine of claim 1, wherein the cooling air flowpath comprises a diffusion section located between the flowpath inlet and the heat exchanger, wherein the diffusion section is configured to reduce a speed of air flowing to the flowpath inlet.

17. The gas turbine engine of claim 1, wherein the cooling air flowpath further defines an exhaust section located between the heat exchanger and the flowpath outlet, wherein the exhaust section is configured to accelerate the cooling airflow from the heat exchanger provided to the bypass passage.

18. The gas turbine engine of claim 1, wherein the fan is a single stage fan.

19. The gas turbine engine of claim 1, wherein L1 is greater than or equal to 20% of L2 and is less than or equal to 50% of L2.

20. The gas turbine engine of claim 1, wherein the circumferential groove is a V-shape configured to receive the core cowl.

\* \* \* \* \*